T. H. TABOR.
TRAP.
APPLICATION FILED NOV. 18, 1916.
1,249,242.
Patented Dec. 4, 1917.
2 SHEETS—SHEET 1.
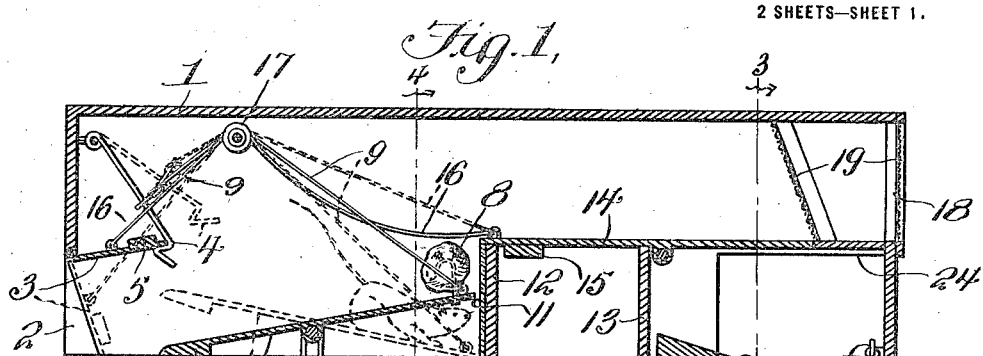
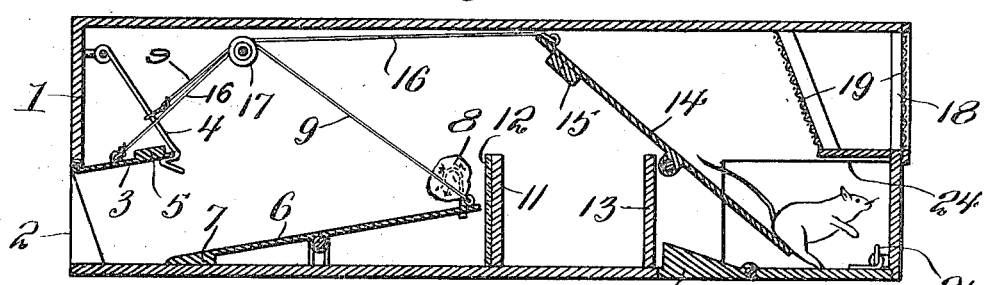
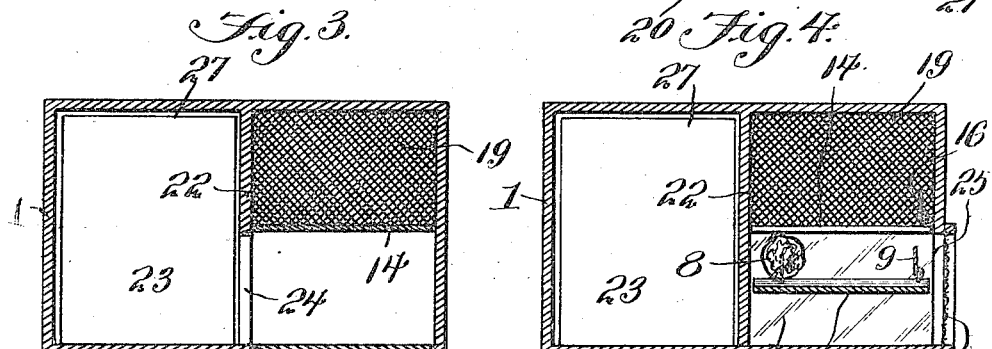
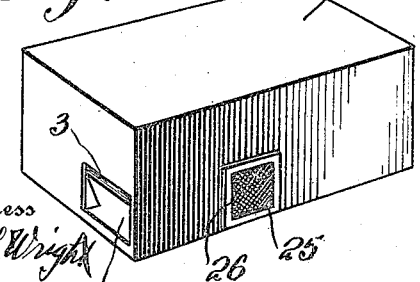
Witness
J. T. L. Wright
L. Wilcox
Inventor
T. H. Tabor
By Victor J. Evans
Attorney

T. H. TABOR.
TRAP.
APPLICATION FILED NOV. 18, 1916.

1,249,242.

Patented Dec. 4, 1917.
2 SHEETS—SHEET 2.

Witness
J. L. Wright
L. Wilcox

Inventor
T. H. Tabor
By Victor J. Evans
Attorney

UNITED STATES PATENT OFFICE.

THOMAS H. TABOR, OF OAK HILL, GEORGIA, ASSIGNOR TO WHITE PATH HOTEL COMPANY, A CORPORATION OF GEORGIA.

TRAP.

1,249,242.  Specification of Letters Patent.  Patented Dec. 4, 1917.

Application filed November 18, 1916. Serial No. 132,129.

*To all whom it may concern:*

Be it known that I, THOMAS H. TABOR, a citizen of the United States, residing at Oak Hill, in the county of Gilmer and State of Georgia, have invented new and useful Improvements in Traps, of which the following is a specification.

This invention relates to self setting animal traps and it consists in the novel features hereinafter described and claimed.

An object of the invention is to provide a trap of simple structure adapted to be used for catching small animals and with this object in view the trap comprises a casing having a platform pivotally mounted therein with a mirror located adjacent the edge of the platform and a bait mounted upon the platform. The door of the trap is operatively connected with the said platform and a catch device is provided for holding the door in an open position. A second platform is pivotally mounted in the casing and is operatively connected with the said catch device whereby the door is released when the said mentioned platform is swung. When the animal enters the trap in an effort to get at the bait and by seeing its reflection in the mirror the first mentioned platform is swung by the weight of the animal and hence the door is released and swings by gravity to a closed position. The animal then realizes that it is trapped and in an effort to make an escape it passes upon the second platform and tilts the same whereby the animal slides into a pound and the door is swung from a closed to an open position and is held by the catch device.

In the accompanying drawing:—

Figure 1 is a longitudinal sectional view of the trap showing the parts in one position.

Fig. 2 is a similar view showing the parts in another position.

Fig. 3 is a transverse sectional view of the trap cut on the lines 3—3 of Fig. 1.

Fig. 4 is a similar view cut on the lines 4—4 of Fig. 1.

Fig. 7 is a perspective view of the trap.

Figure 5:
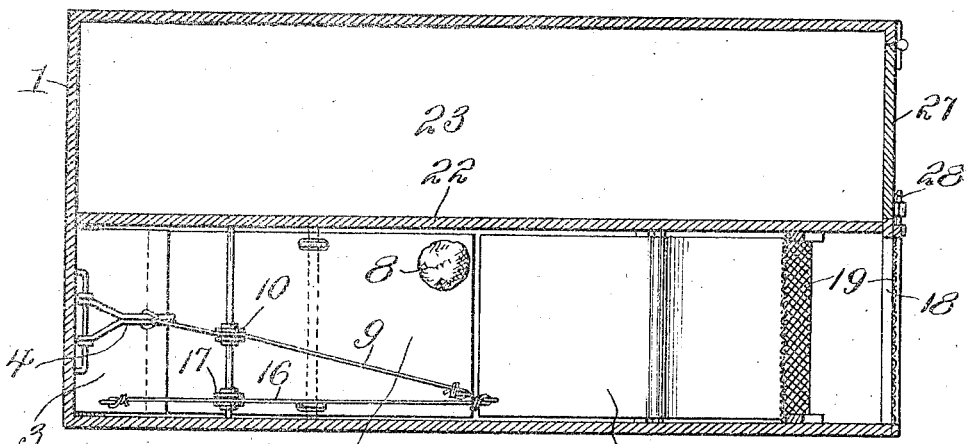
Fig. 5 is a horizontal sectional view of the trap showing the parts in one position.
Figure 6:
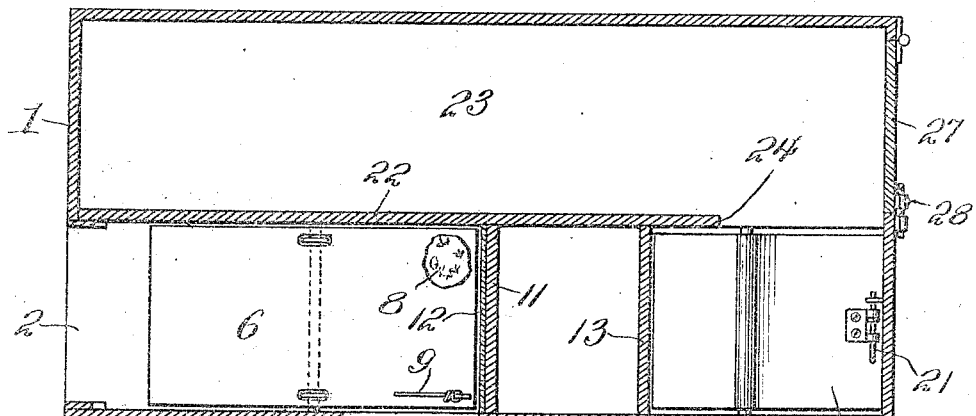
Fig. 6 is a similar view showing the parts in another position.

The trap comprises a casing 1 which may be made of wood or metal, and is provided at one end with a door opening 2. A door 3 is hinged at the upper edge of the opening 2 and a catch 4 is pivotally mounted at the end of the casing 1 and is adapted to engage under the free edge of the door 3 when the same is in an elevated position whereby the said door is held at an open position. The door 3 may be provided with a suitable weight 5 whereby the said door will promptly swing to a closed position when it is released from the catch 4. A platform 6 is pivotally mounted in the casing 1 and is provided at its forward edge with a weight 7 whereby the said platform is held at a normal position in the casing. A bait 8 is mounted at the upper rear portion of the platform 6. A cord 9 is connected at one end with the inner portion of the platform 6 and at its other end with the catch 4. The intermediate portion of the said cord is trained over a pulley 10 which is journaled in the upper portion of the casing 1. A partition 11 is located in the casing 1 beyond the rear edge of the platform 6 and a mirror 12 is located at the forward side of the said partition and adjacent the inner edge of the platform 6. A second partition 13 is located in the casing 1 at a point spaced from the partition 11 and a platform 14 is pivotally mounted in the said casing and is provided at one end with a weight 15 whereby the said platform 14 is normally held in engagement with the upper edges of the partitions 12 and 13 as shown in Fig. 1 of the drawings.

The cord 16 is attached at one end to the forward portion of the platform 15 and at its other end the said cord is attached to the intermediate portion of the door 3. The cord 16 is trained over a pulley 17 journaled in the upper portion of the casing 1. The casing 1 is provided at that end opposite the end at which the opening 2 is located with an opening 18 and screens 19 are located over the said opening 18. If desired the casing 1 may be provided below the platform 14 with a trap door 20 which is weighted at one end and which may be secured in a closed position by means of a bolt 21. The casing 1 is provided with a longitudinally disposed partition 22 and the parts hereinbefore described are located at one side of the said partition. The space at the opposite side of the partition 22 constitutes a pound 23 and the said partition 22 is provided with an opening 24 located adjacent the platform 14 and below the same whereby the spaces at the opposite sides of the partition 22 are connected with each other. The casing 1 is provided at its sides with an opening 25 having a screen 26 located over the same and the said opening 25 serves as means for admitting light into the casing in the vicinity of the mirror 12. The casing 1 is provided at one end of the pound 23 with a door 27 which is normally held in a closed position by means of a bolt 28.

The operation of the trap is as follows:—

Assuming that the parts are in position as shown in full lines in Fig. 1 an animal approaches the opening 2 and scents the bait at the inner end of the platform 6. At the same time the animal will observe its reflection in the mirror 12 and thus it will assume that another animal is attempting to reach the bait. The animal is thus enticed to enter the trap through the opening 2 and when it steps upon the platform 6 the same is swung whereby the cord 9 is moved longitudinally and the catch 4 is disengaged from the door 3. Thus the door 3 swings to a closed position. When the animal realizes that it is trapped it will seek to escape and it will move toward the opening 18 over which the screens 19 are located. Thus the animal will step upon the platform 14 which is swung to the position shown in Fig. 2 and the animal is precipitated toward the opening 24 and passes through the same into the pound 23. When the inner portion of the platform 14 swings in a downward direction the cord 16 is moved longitudinally whereby the door 3 is swung from a closed to an open position and into engagement with the catch 4, thus the trap automatically resets itself by the movement of the animal over the platform 14. Should it be desired to use the trap over a barrel or other receptacle containing water the door 20 may be permitted to swing under the weight of the animal when it descends from the platform 14 and thus the animal may pass through the opening in the bottom of the casing which is normally closed by the door 20 and fall into the barrel or other receptacle. By sliding the bolt 21 into its keeper the door 20 is held in a closed position at the bottom of the casing and hence the trapped animal is compelled to pass through the opening 24 into the pound 23 and may be removed therefrom through the opening which is normally closed by the door 27.

Figure 8:
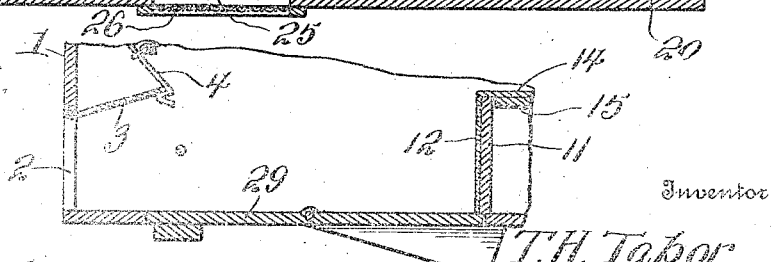
Fig. 8 is a detailed vertical sectional view of an end portion of the trap.

As shown in Fig. 8 a bottom of the casing 1 may be provided with a door 29 which is similar in its structure and operation to the trap door 20 hereinbefore described.

Having described the invention what is claimed is:—

A trap comprising a casing, a door hingedly attached thereto, a catch pivotally connected with the casing and adapted to engage the door to hold the same in an open position, a platform pivotally mounted in the casing, a cord operatively connecting the platform with the catch, a partition located in the casing behind the inner end of said platform, and extending above the same, a lure mounted on the partition, a second platform pivotally mounted in the casing and adapted to normally rest in a level position upon the upper edge of said partition, a cord operatively connecting the second mentioned platform with the door, and means supporting the intermediate portions of both cords at a point above the lower free edges of the door and catch, and a second partition located in the casing under the second mentioned platform in the vicinity of the pivot thereof and between the said pivot and the first mentioned partition, and spaced from the first mentioned partition.

In testimony whereof I affix my signature.

THOMAS H. TABOR.

Copies of this patent may be obtained for five cents each, by addressing the "Commissioner of Patents, Washington, D. C."